US008281234B2

(12) United States Patent
Sridhar

(10) Patent No.: US 8,281,234 B2
(45) Date of Patent: Oct. 2, 2012

(54) DEFINABLE APPLICATION ASSISTANT

(75) Inventor: S. Sridhar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1199 days.

(21) Appl. No.: 11/688,341

(22) Filed: Mar. 20, 2007

(65) Prior Publication Data

US 2008/0235256 A1  Sep. 25, 2008

(51) Int. Cl.
*G06F 17/21* (2006.01)
(52) U.S. Cl. ........................................................ 715/230
(58) Field of Classification Search .......... 715/705–715, 715/230
See application file for complete search history.

(56) References Cited

U.S. PATENT DOCUMENTS

| | | | |
|---|---|---|---|
| 5,317,688 A * | 5/1994 | Watson et al. ................ 715/707 |
| 6,020,886 A * | 2/2000 | Jacober et al. ................ 715/709 |
| 6,021,403 A * | 2/2000 | Horvitz et al. ................. 706/45 |
| 6,099,320 A | 8/2000 | Papadopoulos |
| 6,162,060 A | 12/2000 | Richard et al. |
| 6,340,977 B1 * | 1/2002 | Lui et al. ....................... 715/709 |
| 6,490,633 B1 * | 12/2002 | Linnett et al. ................. 719/320 |
| 6,502,234 B1 * | 12/2002 | Gauthier et al. .............. 717/107 |
| 6,539,419 B2 | 3/2003 | Beck et al. |
| 6,590,589 B1 * | 7/2003 | Sluiman et al. ............... 715/751 |
| 6,791,577 B2 * | 9/2004 | Yoshioka ....................... 715/705 |
| 6,868,403 B1 * | 3/2005 | Wiser et al. ..................... 705/51 |
| 7,024,658 B1 * | 4/2006 | Cohen et al. .................. 717/117 |
| 7,036,079 B2 | 4/2006 | McGlinchey et al. |
| 7,043,193 B1 | 5/2006 | Vashi et al. |
| 2002/0116388 A1 * | 8/2002 | Clement et al. ............... 707/102 |
| 2003/0043187 A1 * | 3/2003 | Li ................................... 345/749 |
| 2003/0103068 A1 * | 6/2003 | Longnecker et al. ......... 345/700 |
| 2004/0111488 A1 | 6/2004 | Allan |
| 2004/0123286 A1 | 6/2004 | Kang et al. |
| 2004/0130572 A1 * | 7/2004 | Bala .............................. 345/762 |
| 2004/0133878 A1 * | 7/2004 | Cole et al. ..................... 717/115 |
| 2004/0135802 A1 * | 7/2004 | Allor ............................. 345/705 |
| 2005/0081153 A1 * | 4/2005 | Meissner ....................... 715/705 |
| 2005/0138559 A1 * | 6/2005 | Santos-Gomez et al. ..... 715/709 |
| 2005/0204337 A1 | 9/2005 | Diesel et al. |
| 2005/0208461 A1 | 9/2005 | Krebs et al. |
| 2005/0278728 A1 * | 12/2005 | Klementiev ................... 719/328 |
| 2006/0005132 A1 * | 1/2006 | Herdeg, III .................... 715/704 |
| 2006/0136841 A1 * | 6/2006 | Fritz .............................. 715/818 |
| 2006/0200792 A1 * | 9/2006 | Hagstrom et al. ............. 717/101 |
| 2006/0259272 A1 * | 11/2006 | Sattler et al. .................. 702/181 |

(Continued)

FOREIGN PATENT DOCUMENTS

EP         1437647 A      7/2004

(Continued)

OTHER PUBLICATIONS

"Supplementary European Search Report", Mailed Feb. 16, 2010, Application No. PCT/US2008/056917, EP Application No. 08732166.7, Filed Date Oct. 14, 2009, pp. 1-11.

(Continued)

*Primary Examiner* — Laurie Ries
*Assistant Examiner* — Frank D Mills

(57) ABSTRACT

A user creates an application assistant by recording a series of steps to complete a specific task involving one or more computer applications. Additional steps that may not involve the use of a computer application may be included. For each step, annotations may be created. The series of steps and annotations are stored in a computer system.

20 Claims, 5 Drawing Sheets

U.S. PATENT DOCUMENTS

2007/0100669 A1* 5/2007 Wargin et al. ............... 705/4
2007/0226637 A1* 9/2007 Yaseen et al. ............... 715/762

FOREIGN PATENT DOCUMENTS

| EP | 1437647 A1 | 7/2004 |
| EP | 1437648 A | 7/2004 |
| EP | 1437648 A2 | 7/2004 |
| WO | WO-9919797 A1 | 4/1999 |
| WO | WO-0237307 A1 | 5/2002 |

OTHER PUBLICATIONS

Rudi, Kost, "Word 2000 Professionelle Textverarbeitung", Markt+Technik Verlag, 2003, pp. 32.

Applix, et al., "ELF User's Guide Passage", ELF User's Guide, Feb. 1, 2000, pp. 1-72.

Corel Corporation, "Perfectscript and Macro User Guide passage", Retrieved at <<www.jdan.com/perfectscript/macro9en.pdf >>, Perfectscript and Macro User Guide, Jan. 1, 1999, pp. 64.

European Search Report for 08732166.7 mailed Feb. 16, 2010.

Rudi Kost: :"Word 2000 Professionelle Textverarbeitung" 2003, Markt+Technik Verlag, Munchen, XP002567016.

Applix et al: "ELF User's Guide passage" ELF User'S Guide, XX, XX, Feb. 1, 2000, pp. 1-7, XP002255711.

Corel Corporation: "Perfectscript and Macro User Guide passage" Perfectscript and Macro User Guide, XX, XX, Jan. 1, 1999, pp. 1-63, XP002255712.

Written Opinion for PCT/US2008/056917 mailed Jul. 14, 2008.

Search Report for PCT/US2008/056917 mailed Jul. 14, 2008.

* cited by examiner

DEFINABLE APPLICATION ASSISTANT

BACKGROUND

This Background is intended to provide the basic context of this patent application and it is not intended to describe a specific problem to be solved.

Over time, software has become more and more complicated. The additional variety of tasks that software can accomplish makes the software itself more complex. While efforts have been made to make software more intuitive and easier to use, the complexity in completing tasks has grown. In the past, users would refer to manual for help but manuals seldom discuss complex problems. In addition, macros have been created to automated repetitive tasks, but many tasks need to be specifically tailored.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An application assistant is disclosed. A user creates an application assistant by selecting to store a series of steps where one or more of the steps involves an underlying computer application. Steps are created and during each step, annotations may be created. The annotations may be related or unrelated to the underlying application. Once the steps are complete, the steps and annotations are stored as application assistant files which can be read, modified, deleted or used to create additional application assistants. In use, the application assistant guides a user through a task. A progress report provides a user a status and allows a user the option select to move forward or backward through the application assistant.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any stricture, it is not intended that the scope of any claim element be interpreted based on the application of 35 U.S.C. §112, sixth paragraph.

Figure 1:
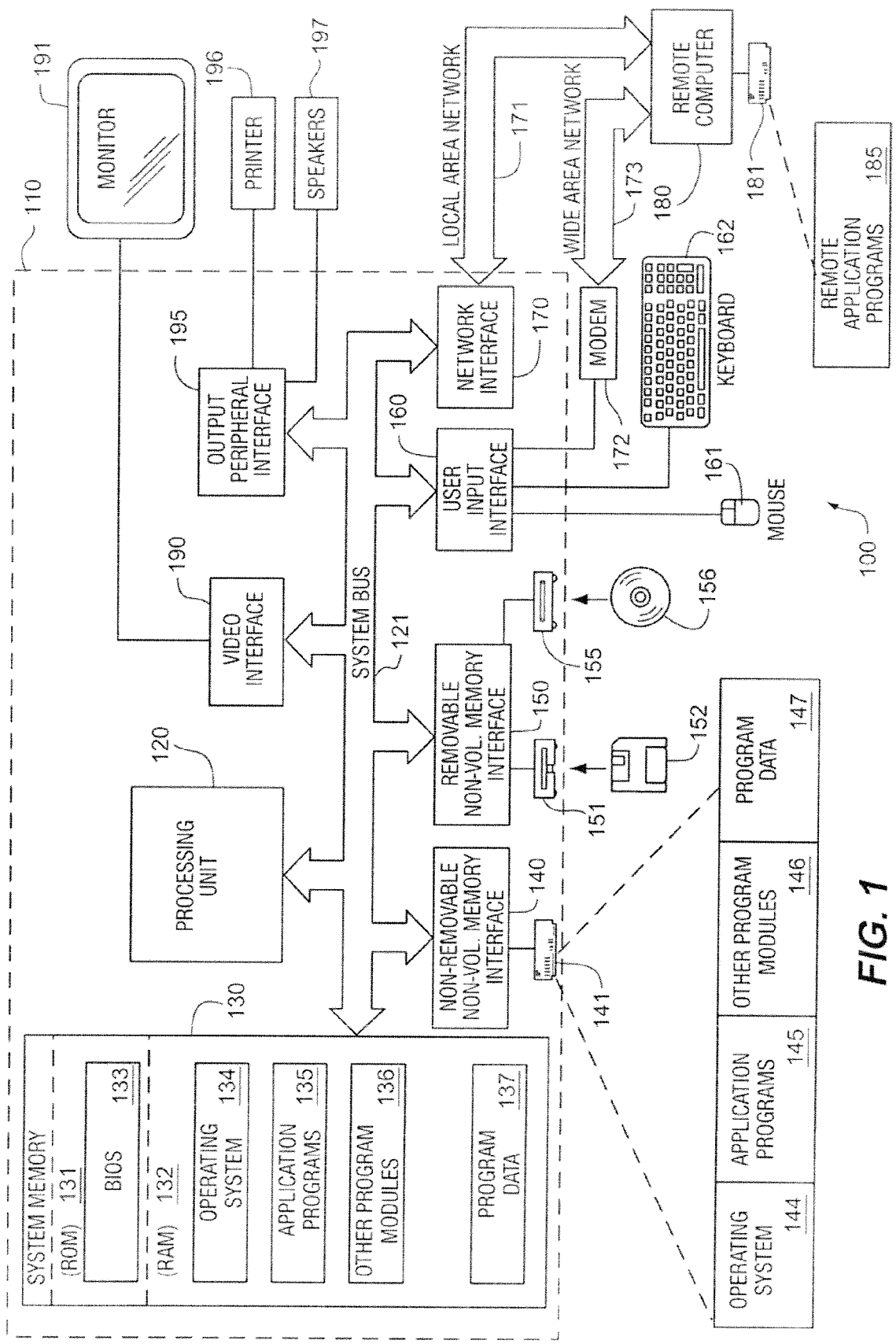
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 111. Components of computer 110 may include, but are not limited to, a processing unit 120, a system memory 130, and a system bus 121 that couples various system components including the system memory to the processing unit 120. Computer 110 typically includes a variety of computer readable media. Computer readable media can be any available media that can be accessed by computer 110 and includes both volatile and nonvolatile media, removable and non-removable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable nonvolatile optical disk 156 such as a CD ROM or other optical media. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
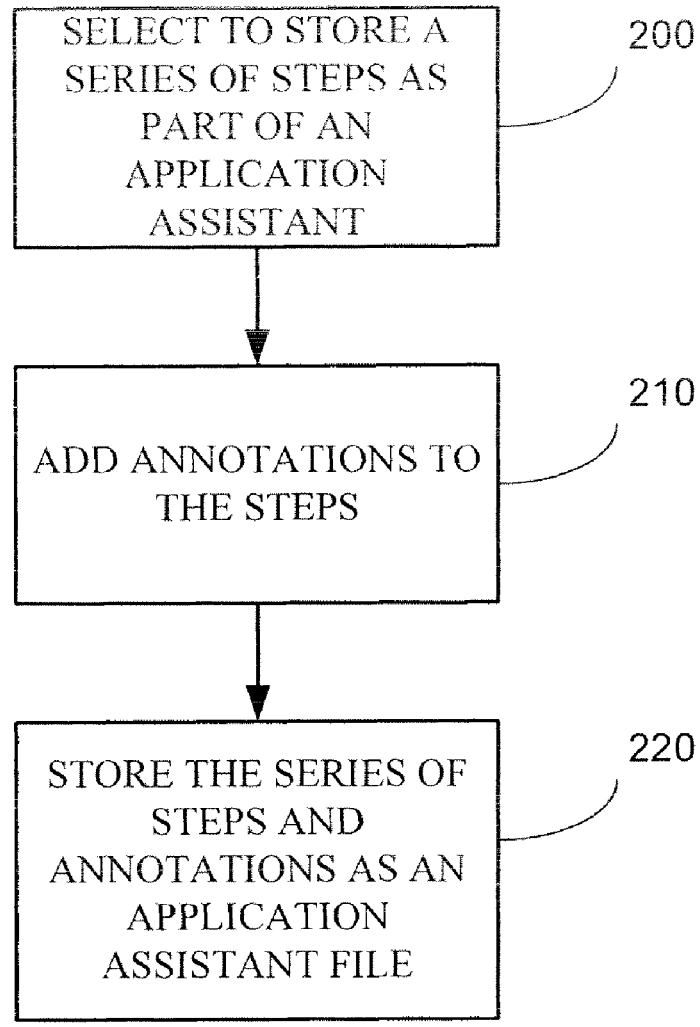
FIG. 2 is a flowchart of a method of creating an application assistant.

FIG. 2 is an illustration of a method of providing an application assistant in a computer system such as computer 100. In general, many tasks in a typical day can be broken down into a series of steps. Some of the steps use a computer application while some steps may not. As computer applications have become more detailed and sophisticated, the ability to quickly learn to use a computer program without instruction has become more and more difficult. In the past, flowcharts and checklists were created to help keep track of the steps that must be completed to successfully execute a task. However, such lists were not interactive in that users could easily skip steps or repeat steps without even realizing it. In addition, the lists were often separate from the base computer program. Further, once the checklists were created, it was tricky to keep them up to date or reflective of the current knowledge of the user.

At block 200, a series of steps may be selected to be stored as part of an application assistant. At least one of the steps may be executed on the application on the computer 100. However, the steps may relate to multiple computer applications and some of the steps may not even be computer related. For example, when entering an order on a computer application a first step may require opening a sales application on a computer 100. A second step may require opening an accounts receivable application to ensure that the client has paid its bills and is entitled to place new orders. If the client is behind on paying bills, the next step may requiring speaking with the account manager to determine the reason the account is delinquent. The speaking step does not include the use of computers at all. However, this step may be created in the assistant application.

Figure 3:
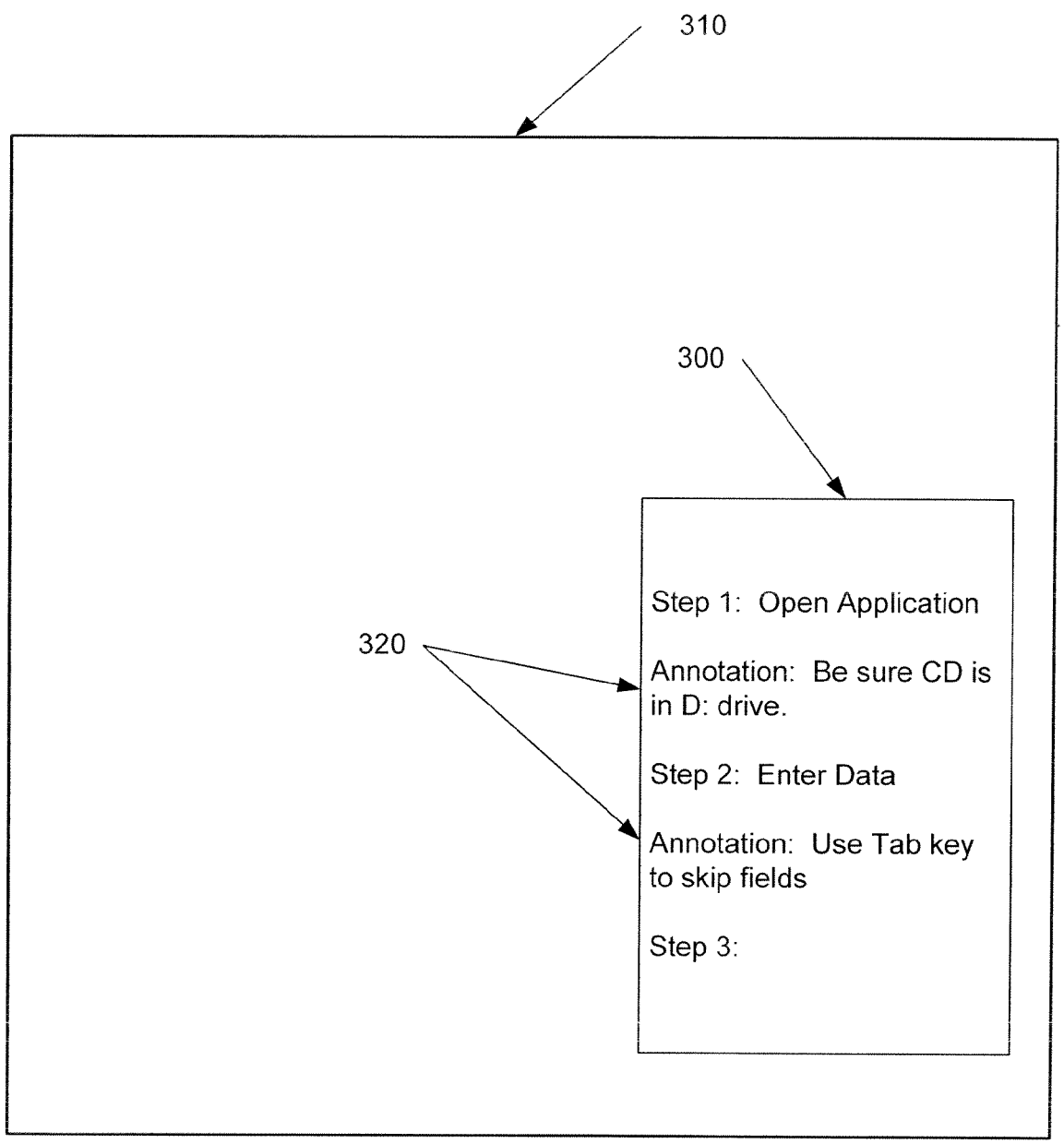
FIG. 3 is an illustration of an application assistant.

The application assistant may be an additional display on the compute 100 that provides a user the opportunity to read, add, edit, delete, modify or view additional information about the series of steps that make up a task. FIG. 3 is an illustration of a sample application assistant 300 being displayed. Of course, the application assistant may take on a variety of forms. In one embodiment, the application assistant 300 is text inside a pop-up box that is displayed over a base application 310 that is being annotated. In another embodiment, the application assistant 300 is a combination of text, graphics and sound. In yet another embodiment, the application assistant 300 contains graphics selected from an application involved in one of the steps.

In one embodiment, the series of steps are performed by a user. In macros, the macros perform all the steps that the macro recorded. The application assistant 300 is different in that it provides directions to the user to take steps to complete a task. In one embodiment, the application assistant 300 may be combined with a macro like feature, where a user can select to insert a macro into the application assistant 300, but the user still has to take part in completing the steps.

In creating the application assistant 300, parameters may be placed on the particular application assistant 300 or process type being created. For example, the application assistant 300 may be created for all generic invoices that are created. In another example, the application assistant 300 may be created for invoices for a specific client. And, in yet a further embodiment, the application assistant 300 may be created for a specific invoice number or specific instance of a process type. In a word processing example, the application assistant 300 may be created for all letters, for a specific type of letter or for specific letters to a specific client. Of course, other uses of parameters may be possible.

At block 210, annotations 320 may be allowed to be added to the steps from block 200. Annotations 320 may be text blocks that provide commentary or direction on the steps to be taken. The annotation 320 also may be graphics that are from the application 310 that is being annotated. For example, an input box may be copied from the underlying application 310 and may be added to the annotation 320. In another embodiment, the annotation 320 simply states a reminder such as be such that in a letter, a title is used in a proper manner.

The annotations 320 may be created by the user. In addition, the annotations 320 may be created by another party and may be added to a user computer 100 such as by downloading the application assistant 300 or the annotation 320. Of course, other sources of the annotation 320 are possible.

At block 220, the series of steps and annotations 320 may be stored in the computer system as an application assistant file using a file name. The file may be stored in a local computer 100 or in a remote computer 100. The application assistant file may be stored with other application assistant files in a repository of application assistant files. The application assistant files may be opened, reviewed, modified, deleted or stored. In addition, the files may be used as the base for other application assistant files. For example, the application assistant for a word processing letter may be used as an application assistant for specific letter of letter or letters to a specific client. The actual format of the application assistant file may be a variety of formats such as an XML file or a form of a macro file, etc., and the file may actually be a plurality of files.

The data that is entered while the steps are being recorded may not be saved as part of the application assistant file. In one embodiment, the input fields are highlighted to indicate that it is advisable to enter data but the values previously entered are not added. In another embodiment, an option may be provided to save the data that is entered such that it will not have to be entered repeatedly.

Figure 4:
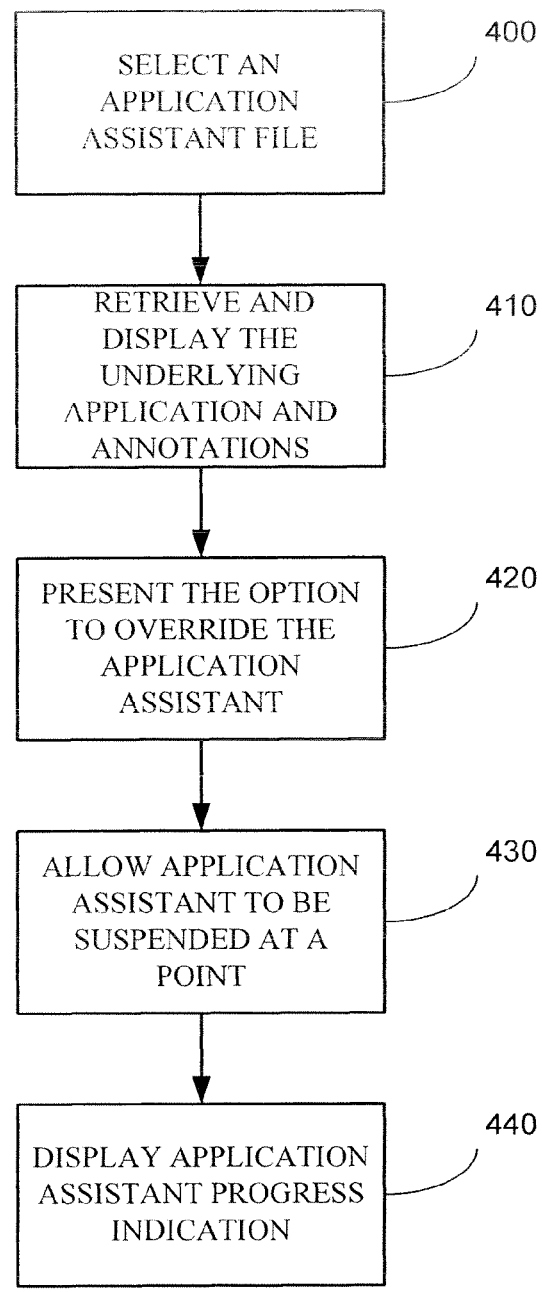
FIG. 4 is a flowchart of using the application assistant.

FIG. 4 may be an illustration of using an application assistant 300 after it has been created. At block 400, an application assistant 300 may be selected. As previously mentioned, the application assistant 300 files may be stored in a repository. A user may review the application assistant 300 files in the repository and select the desired application assistant 300. If a particular application assistant 300 is not exactly right, a similar application assistant file may be selected and the application assistant file may be modified to be a better fit and be re-saved as a new application assistant file.

At block 410, the underlying application 310 and the annotations from the application assistant 300 may be retrieved and displayed. As described previously, the application assistant 300 is different from a macro in that the application assistant 300 requires user input for the application assistant 300 to proceed. For example, the application assistant 300 provides guidance on how to complete a task, such as draft a letter to the Commissioner of the USPTO, but it does not actually write the letter to the Commissioner of the USPTO. If the application assistant 300 relates to a word processing based task, the word processor may be opened and if the task relates to a customer relationship management program ("CRM"), the CRM program may be opened and in each case, the application assistant 300 will be opened.

At block 420, the user may be presented the option to override the application assistant 300. For example, the application assistant 300 may insist that a country code be entered on an invoice. If the customer and vendor are in the United States, a country code may not be necessary. Accordingly, a user may be able to override the application assistant 300.

At block 430, the application assistant 300 may be suspended by a user at a point. For example, a user may receive a telephone call and may be forced to stop using the application assistant 300 and look up some other information. When the application assistant 300 is suspend, it may save the data that was entered to that point and the point in the task at which it was suspended. Upon restart of the application assistant 300, the application assistant 300 may return to the point at which the application assistant 300 was stopped. For example, if the task has six steps and three are complete, the application assistant 300 may start at the fourth step. In one embodiment, the data that was inputted before the application assistant 300 was suspended may be filled in the proper fields. In this way, the data will not have to be entered repeatedly if the application assistant 300 is suspended repeatedly.

Figure 5:
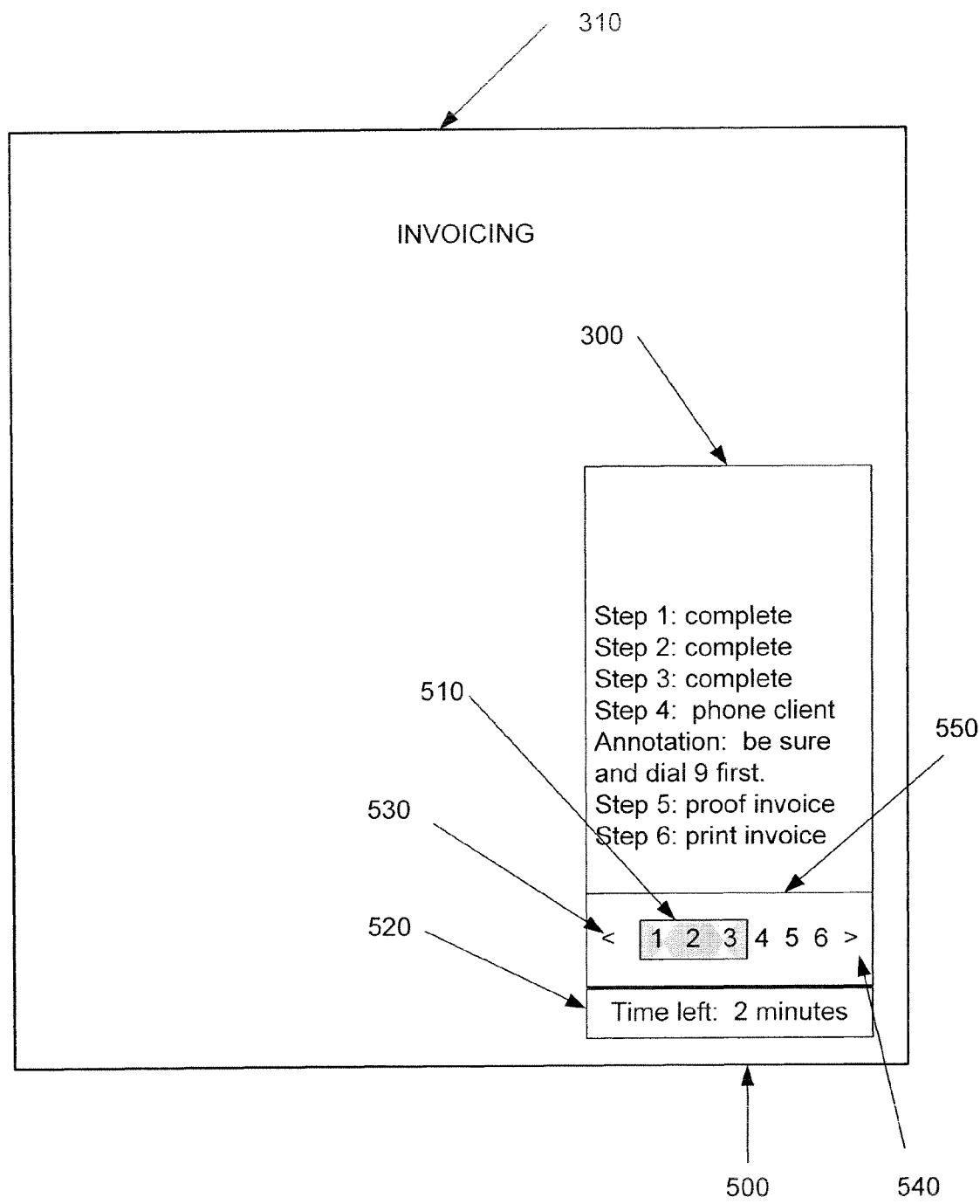
FIG. 5 is an illustration of a progress display.

At block 440, a progress indication 500 may be displayed that provides a visual indication of the progress of the application assistant 300. FIG. 5 may illustrate a sample progress indication 500 and it illustrates that the current application assistant 300 has complete three of six steps 510. The progress indication 500 may indicate an estimated time 520 for the application assistant 300 to complete. The progress indication 500 may also allow a user to select to skip ahead or behind through the application assistant 300. For example, a user could select the back 530 or forward arrow 540 or any of the steps listed 550. In one embodiment, the progress indicator 500 may be part of the application assistant 300. In another embodiment, the progress indicator 500 is in a separate window. In other embodiment, a link is provided that connects to a screen dedicated to displaying the progress indicator 500.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of using an application assistant in a computer system comprising:
   recording a series of steps to complete a specific task involving a plurality of computer applications;
   allowing the addition of steps, some of which involve different computer applications;
   allowing the addition of steps which do not involve the use of a computer application or the computer system;
   allowing annotations from a user to be added to the steps;
   requiring user inputs or interaction for the application assistant to proceed;
   storing the series of steps, annotations and the user inputs or interactions required as an application assistant entity using a unique name along with associated descriptive information about the entity and estimated times of completion associated with each step in a repository of application assistants in a computer system; and allowing the application assistant entity to be shared from the repository with other users wherein the application assistant entity can be shared with other users, who in turn can choose to update the application assistant entity for their use.

2. The method according to claim 1, wherein the steps relate to the invocation and the use of a plurality of other application assistant entities.

3. The method according to claim 1, wherein when the application assistant is created, it is optional to store, view and update the user actions as well as the annotations associated with each step.

4. The method according to claim 1, further comprising providing an option to override the application assistant at any step during the use of the application assistant.

5. The method according to claim 1, further comprising allowing the application assistant to be suspended at a point, and upon restart, returning the application assistant to the point at which the application assistant was suspended.

6. The method according to claim 1, wherein when a specific invocation of the application assistant is used to complete a specific task, it is optional to update one or more steps or annotations associated with each step, and wherein updates apply to the specific invocation of the application assistant only.

7. The method according to claim 1, further comprising providing an option to review a history of recent invocations or uses of the application assistant for up to a pre-specified maximum number of invocations.

8. The method according to claim 1, further comprising providing an option to store a particular instance of a previous invocation or use of the application assistant along with estimated times of completion associated with each step as well as corresponding user actions.

9. The method according to claim 8, further comprising providing an option to transfer updates of one or more steps or annotations from a particular instance of a previous invocation of the application assistant to apply to all future uses of the application assistant.

10. A computer readable storage medium that does not consist of a signal, the computer readable storage medium storing computer executable instructions for using an application assistant in a computer system, the computer executable instructions comprising instructions for:
recording a series of steps to complete a specific task involving a plurality of computer applications;
allowing the addition of steps, some of which involve different computer applications;
allowing the addition of steps which do not involve the use of a computer application or the computer system;
allowing annotations from a user to be added to the steps;
requiring user inputs or interaction for the application assistant to proceed;
storing the series of steps, annotations and the user inputs or interactions required as an application assistant entity using a unique name along with associated descriptive information about the entity and estimated times of completion associated with each step in a repository of application assistants in a computer system; and
allowing the application assistant entity to be shared from the repository with other users wherein the application assistant entity can be shared with other users, who in turn can choose to update the application assistant entity for their use.

11. The computer readable storage medium of claim 10, wherein the steps relate to the invocation and the use of a plurality of other application assistant entities.

12. The computer readable storage medium of claim 10, wherein when the application assistant is created, it is optional to store, view and update the user actions as well as the annotations associated with each step.

13. The computer readable storage medium of claim 10, wherein the computer executable instructions further comprise instructions for providing an option to override the application assistant at any step during the use of the application assistant.

14. The computer readable storage medium of claim 10, wherein the computer executable instructions further comprise instructions for:
allowing the application assistant to be suspended at a point; and
upon restart, returning the application assistant to the point at which the application assistant was suspended.

15. The computer readable storage medium of claim 10, wherein the computer executable instructions further comprise instructions for providing an option to review a history of recent invocations or uses of the application assistant for up to a pre-specified maximum number of invocations.

16. The computer readable storage medium of claim 10, wherein the computer executable instructions further comprise instructions for providing an option to store a particular instance of a previous invocation or use of the application assistant.

17. The computer readable storage medium of claim 16, wherein the computer executable instructions further comprise instructions for providing an option to transfer updates from a particular instance of a previous invocation of the application assistant to apply to all future uses of the application assistant.

18. A computer system comprising:
a processor for executing computer executable instructions; and
a memory storing computer executable instructions comprising instructions for:
recording a series of steps to complete a specific task involving a plurality of computer applications;
allowing the addition of steps, some of which involve different computer applications;
allowing the addition of steps which do not involve the use of a computer application or the computer system;
allowing annotations from a user to be added to the steps;
storing the series of steps, annotations and the user inputs or interactions required as an application assistant entity using a unique name along with associated descriptive information about the entity and estimated times of completion associated with each step in a repository of application assistants in a computer system;
allowing the application assistant entity to be shared from the repository with other users wherein the application assistant entity can be shared with other users, who in turn can choose to update the application assistant entity for their use;
providing an option to review a history of recent invocations or uses of the application assistant for up to a pre-specified maximum number of invocations;
providing an option to store a particular instance of a previous invocation or use of the application assistant along with estimated times of completion associated with each step as well as corresponding user actions; and
providing an option to transfer updates of one or more steps or annotations from a particular instance of a previous invocation of the application assistant to apply to all future uses of the application assistant.

19. The computer system of claim 18, wherein the application assistant entity can be suspended at a point and, upon restart, returned to the point at which the application assistant was suspended.

20. The computer system of claim 18, wherein the application assistant entity can be overridden at any step during the use of the application assistant.

* * * * *